US005575936A

United States Patent [19]
Goldfarb

[11] Patent Number: 5,575,936
[45] Date of Patent: Nov. 19, 1996

[54] PROCESS AND APPARATUS FOR ETCHING AN IMAGE WITHIN A SOLID ARTICLE

[75] Inventor: Boris Goldfarb, Krasnogorsk, U.S.S.R.

[73] Assignee: Firebird Traders Ltd., Princeton, N.J.

[21] Appl. No.: 290,046

[22] Filed: Aug. 12, 1994

Related U.S. Application Data

[63] Continuation of Ser. No. 992,918, Dec. 18, 1992, abandoned.

[51] Int. Cl.⁶ .................................................. B23K 26/02
[52] U.S. Cl. ............................. 219/121.68; 219/121.82; 219/121.61
[58] Field of Search ..................... 219/121.68, 121.69, 219/121.82, 121.85, 121.61

[56] References Cited

U.S. PATENT DOCUMENTS

| 4,092,518 | 5/1978 | Merard | 219/121.69 |
|---|---|---|---|
| 4,190,759 | 2/1980 | Hongo et al. | 219/121.69 |
| 4,425,769 | 1/1984 | Hakoune | 63/32 |
| 4,467,172 | 8/1984 | Ehrenwald et al. | 219/121 LH |
| 4,651,283 | 3/1987 | Sciaky et al. | 364/477 |
| 5,171,963 | 12/1992 | Saruta et al. | 219/121.69 |
| 5,206,496 | 4/1993 | Clement et al. | 250/271 |
| 5,313,193 | 5/1994 | Dubois et al. | 340/572 |

FOREIGN PATENT DOCUMENTS

| 1818307A1 | 5/1993 | U.S.S.R. |
| 1838163A3 | 8/1993 | U.S.S.R. |

OTHER PUBLICATIONS

Russian Inventor's Certificate 321,422 of Jan., 1972, with English translation of Summary.

*Primary Examiner*—Mark H. Paschall
*Attorney, Agent, or Firm*—Collard & Roe, P.C.

[57] ABSTRACT

An apparatus and process for etching an image within a solid article including the steps of focusing a laser to a focal point within the article and positioning the article with respect to the focal point. The laser is fired so that local disruption occurs within the article to form the image within the article.

1 Claim, 4 Drawing Sheets

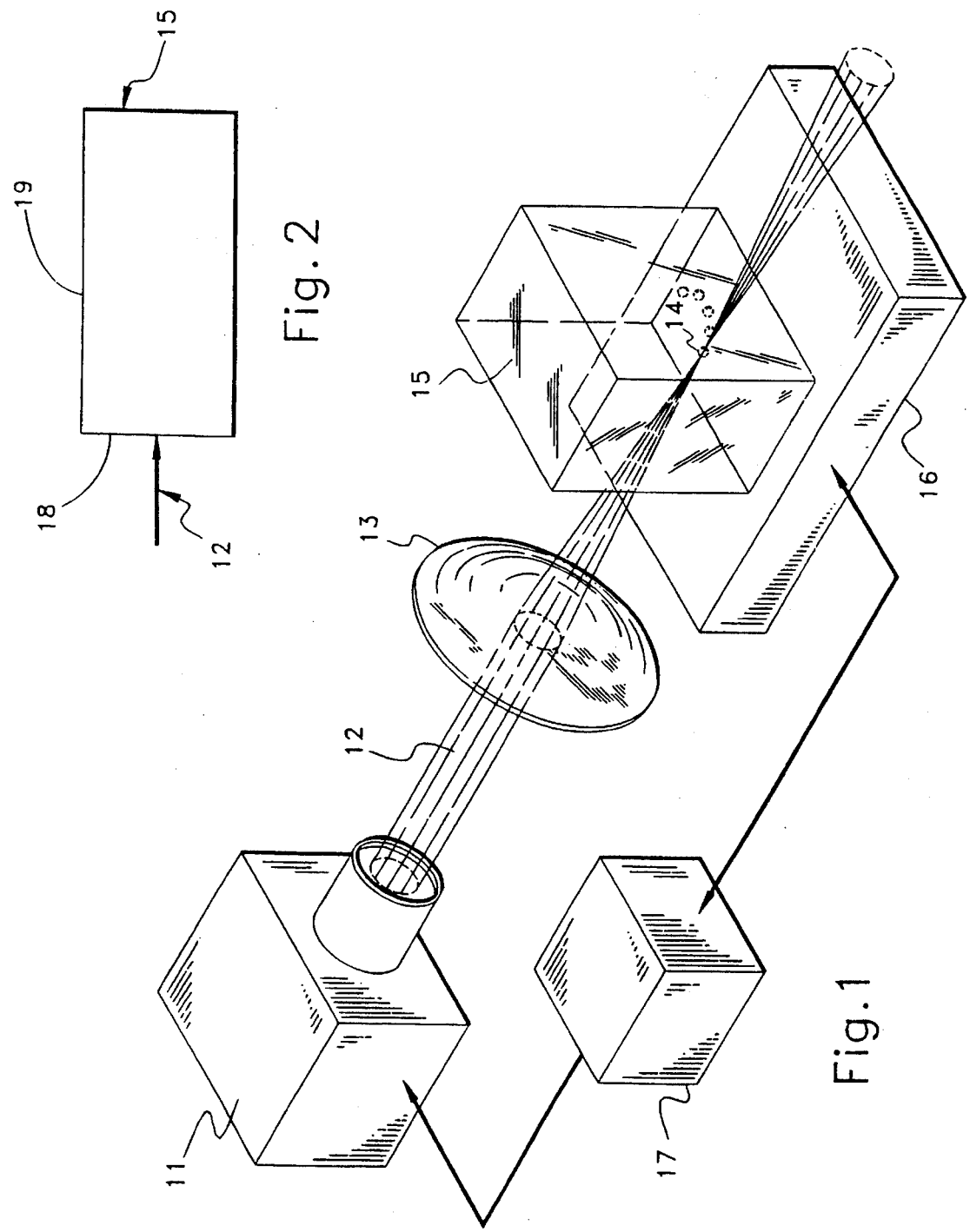

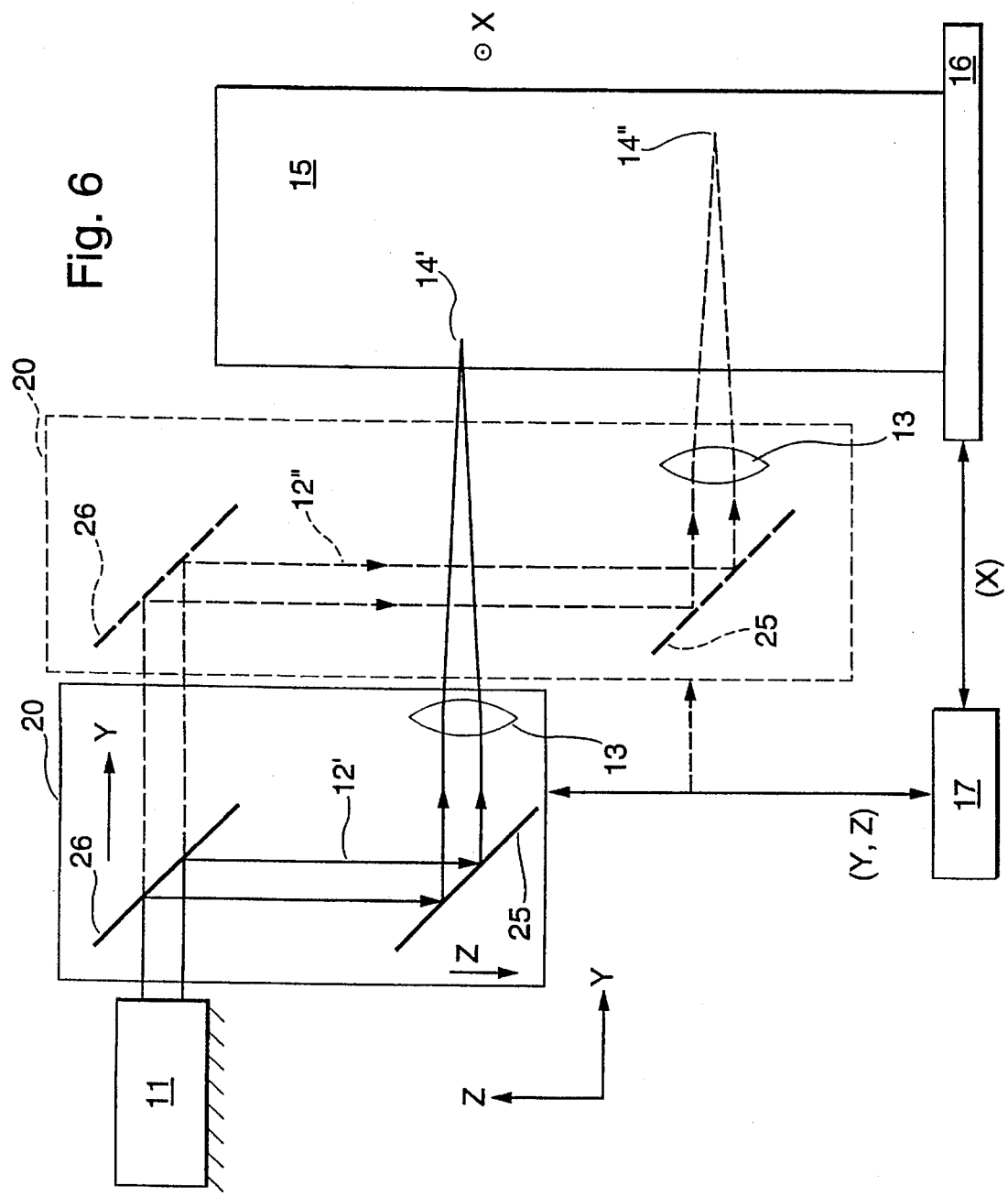

PROCESS AND APPARATUS FOR ETCHING AN IMAGE WITHIN A SOLID ARTICLE

CROSS-REFERENCE TO RELATED APPLICATION

This is a continuation of my U.S. patent application Ser. No. 07/992,918, filed Dec. 18, 1992, and now abandoned.

BACKGROUND OF THE INVENTION

1. Field of the Invention

The present invention relates to a process and apparatus for etching an image within a solid article. More specifically, it relates to laser etching individual points of an image within the article to form the image.

2. The Prior Art

It is known that laser light interacts with opaque materials to alter the physical characteristics of the material. This phenomenon is utilized in various laser technologies, i.e., cutting, welding, drilling holes, and imprinting textures on the surface of materials. The U.S. patent to Sorkoram, U.S. Pat. No. 4,851,061, discloses a method and apparatus using a laser beam for cutting thermoplastic materials into different shapes. The U.S. patent to Macken, U.S. Pat. No. 4,458,133, discloses a laser apparatus for cutting sheets of material using templates.

Also known are materials which reflect laser light, for example, the U.S. patent to Nakamachi et al, U.S. Pat. No. 5,066,525, and the U.S. patent to Wood et al, U.S. Pat. No. 4,842,389, which disclose holographic heads-up displays. Also, it is known that laser beams travel through transparent materials, for example, lenses in laser systems, without interaction. However, if the concentration of laser radiation reaches a sufficiently high level, the transparent material may begin to break down, for example, when lenses in laser systems are damaged. Previous attempts have not been made to constructively utilize the interaction of laser beams with transparent materials.

SUMMARY OF THE INVENTION

It is therefor an object of the present invention to provide a process and apparatus which overcomes the drawbacks of the prior art and utilizes a laser to constructively interact with a transparent materials.

It is another object of the present invention to provide a process and apparatus where a focused laser beam causes local destruction within a solid article, without effecting the surface thereof.

These and other related objects are achieved according to the invention by a process for etching an image within a solid article, including the steps of focusing a laser to a focal point within the article. The position of the article with respect to the focal point is varied and the laser beam is fired so that local disruption occurs within the article to form the image within the article.

The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 1 is a schematic view of the apparatus according to the invention;

FIG. 2 is a diagram of the article in which the image is etched;

FIG. 6 is a further embodiment of the positioning system shown in FIG. 4.

DETAILED DESCRIPTION OF THE PREFERRED EMBODIMENTS

Figure 3:
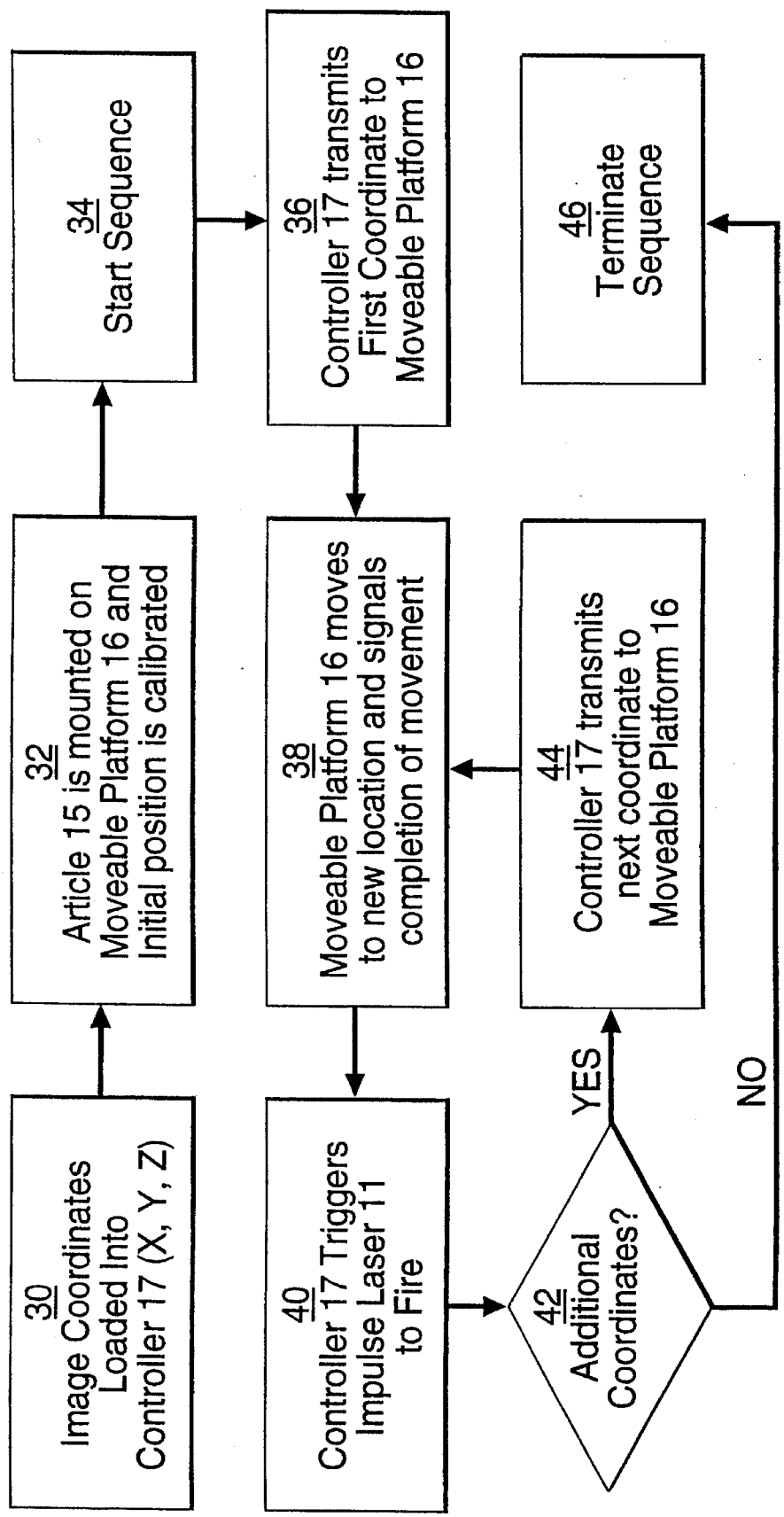
FIG. 3 is a flow chart describing the process according to the invention.

Referring now in detail to the drawings and, in particular, FIG. 1, there is shown an impulse laser 11 which projects a laser beam 12 towards focusing lens 13. Beam 12 is then focused to a focal point 14 within a solid article 15. A movable platform 16 supports and alters the position of article 15. A controller 17 is coupled to impulse laser 11 and movable platform 16 to coordinate their respective functions. Controller 17 instructs movable platform 16 to move article 15 so that focal point 14 is located at a particular point within article 15. Controller 17 then directs impulse laser 11 to generate a pulsed laser beam 12 which, after passing through focusing lens 13, interacts with the material of article 15 at focal point 14.

Article 15 may be made, for example, from clear glass, colored glass, optical crystals or organic glass, and may be translucent or transparent. Glass is generally classified as an amorphous solid. In the case of a transparent block of glass, the internal structure allows light rays to pass directly through. The intensity of the radiation at focal point 14 disturbs or locally destructs the glass in the vicinity of focal point 14. This is achieved, for example, by heating and/or melting and/or expanding the glass at the focal point to cause cracking. The surface and surrounding area of the block of glass are unaffected.

This local destruction or disruption creates an imperfection within article 15 which has a lower translucence than the surrounding areas. As a result, the point of local destruction appears as a foreign object encased within a glass block. The characteristics of the local disruption, e.g., the size of the point, can be controlled by adjusting the intensity or length of the laser emission. A series of local disruptions can be coordinated to form two-dimensional and three-dimensional images within solid articles. Surprisingly, it was found that the contrast of the image can be increased by introducing laser beam 12 into a first side 18 of article 15 which is different from a second side 19 of article 15 which will ordinarily be facing the observer, as shown in FIG. 2. The laser beam may enter the object through first side 18 at an angle of 90° from the observation angle through second side 19, for example. The surface through which the beam enters is preferably an optically flat surface. The beam has a 90° angle of incidence, for example. If the beam had another angle of incidence, the beam would refract as it entered the dense material, complicating the calculations required to form the image from discrete points. The image is created by first melting the farthest points from first side 18 and then melting the points closer to first side 18. In this manner, the incoming beam need not pass through already melted areas, which would cause distortion and/or refraction.

Laser 11 may be, for example, a hard body impulse laser, a pulsed solid-state laser, or a Q-spoiled laser. The laser preferably has an energy output of 50 Mjoules, a pulse frequency of 1 Hz and a pulse length of 10 nsec, for example. The characteristics of the laser should be selected so that the laser emission disrupts, melts or causes a microfracture of the article at the focal point without affecting the area surrounding the focal point. Lens 13 is a standard type, as is well known to those skilled in the art. Beam 12 enters lens 13 with the rays along parallel lines and having the same frequency. The beam can be focused into a spot approximately as wide as the wavelength of the rays. Thus, intense energy can be focused into a very small area.

FIG. 3 shows a flow chart outlining the various steps for etching an image within a solid article. In initial step 30, the image coordinates are loaded into controller 17. If a two-dimensional image is to be etched, a series of two-dimensional coordinates will be loaded into controller 17. If a three-dimensional image is to be etched, a set of three dimensional coordinates will be loaded into controller 17. The coordinates may represent the absolute position of each individual point of the image, or they may represent the relative position of a point with respect to the previous point. For example, the cartesian coordinates representing a two-dimensional letter "L" would be as follows: (0,4) (0,3) (0,2) (0,1) (0,0) (1,0) (2,0). If the coordinates were describing the relative position of one point with respect to the previous point, the same two-dimensional letter "L" would be represented by the following coordinates: (0,4) (0,−1) (0,−1) (0,−1) (0,−1) (1,0) (1,0). The relative position coordinates are calculated by taking the difference between consecutive coordinates. This calculation or conversion can be performed by controller 17 or may be performed ahead of time. The various coordinates may also be represented in other ways, e.g. vectors.

Next, in step 32, article 15 is mounted on movable platform 16 and the initial position is calibrated. For example, it is important for controller 17 to recognize the edges and center of article 15. In this manner, controller 17 can appropriately coordinate the operation of movable platform 16 and laser 11 so that the image is properly placed or centered within article 15. If a set of image coordinates are centered around the origin (0,0), then it will be necessary for controller 17 to translate the entire set of coordinates so that the image will be centered around the center point of article 15. Also, different sized articles 15 will have different center points. The coordinates can be appropriately adjusted by translating the coordinates so that they center around the central point of article 15 instead of the origin (0,0). This translation of coordinates can be performed by controller 17 or can be calculated beforehand with the translated coordinates then being loaded into controller 17.

It is also possible that controller 17 or a computer in a prior step rotates, enlarges, reduces, or otherwise manipulates the image coordinates so that one set of image coordinates could actually be used to generate a variety of slightly different but related images within article 15.

In step 34, the start sequence is initiated. In step 36, controller 17 transmits the first coordinate to movable platform 16. In step 38, movable platform 16 moves to the coordinate as instructed by controller 17 and then signals controller 17 that the location has been reached. In step 40, controller 17 then triggers impulse laser 11 to fire. Local disruption is then caused at focal point 14. In step 42, controller 17 queries as to whether additional coordinates exist in the image coordinates file. If additional coordinates exist, step 44 is executed in which controller 17 transmits the next coordinate to movable platform 16, following which steps 38, 40 and 42 are repeated. This sequence continues for all coordinates in the image file. If, in step 42, additional coordinates are not present in the image coordinate file, then step 46 is executed in which the sequence is terminated.

Figure 4:
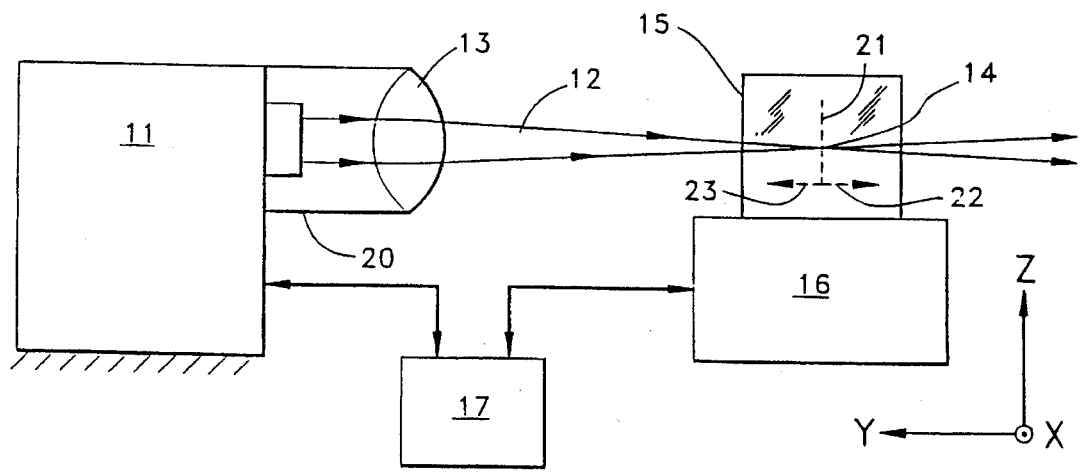
FIG. 4 is a diagram showing how the article is positioned.

FIG. 4 shows a preferred embodiment with laser 11 and focusing lens 13 in a fixed position. Movable platform 16 is capable of movement along three axes, designated as the "X", "Y" and "Z" axes. Movement in each of the three directions is controlled by a step motor or a pair of step motors, for example. However, any type of an XYZ table can be employed as is well known, for example, from U.S. Pat. Nos. 5,149,937 and 5,153,409, the subject matter of which is incorporated herein. The step motors, for example, rotate threaded rods which pass through cooperatively sized bolts. The bolts are fixed to movable platform 16 such that rotation of the threaded rods causes movable platform 16 to move a predetermined distance along one of the three axes. Each step motor rotates the threaded rod through a predetermined angle following a single pulse. The predetermined angle may be 90° or 360°, for example. The angle may be adjusted through the use of a transmission. The rotation of the threaded rod moves the cooperatively sized bolt and platform a short linear distance. Preferably, this linear distance is a sufficiently small increment to allow the platform to move accurately to each coordinate within a predetermined tolerance.

Controller 17 may include a microprocessor which signals one or more step motors by one or more pulses to move movable platform 16 based on the difference between consecutive coordinates. A sufficient number of pulses are provided so that the increments of the step motors add up to the required linear distance. Controller 17 moves platform 16 so that focal point 14 is moved to various positions within article 15 to create local disruptions and form an image or outline of an image. Focal point 14 lies within a plane 21 which is transverse to the direction of travel of beam 12. The concentration of radiation of beam 12 in front of plane 21 (direction 23) or in back of plane 21 (direction 22) is sufficiently low to pass through article 15 without affecting it. Only at point 14 within plane 21 does beam 12 reach a sufficiently high concentration to locally disrupt the structure. On either side of plane 21, beam 12 forms a cone, as can be clearly seen in FIG. 1. In direction 23, the cone extends to lens 13. In direction 22, the cone extends outward to infinity. The intensity of the laser emission, i.e., radiation is distributed along the cross-sectional area of the beam. As can be appreciated, the smaller the area, the higher the concentration of radiation. At plane 21, beam 12 has the smallest cross-sectional area and the highest concentration of radiation. Certain areas of article 15 in direction 22 or 23, although within beam 12, are unaffected by beam 12.

Figure 5:
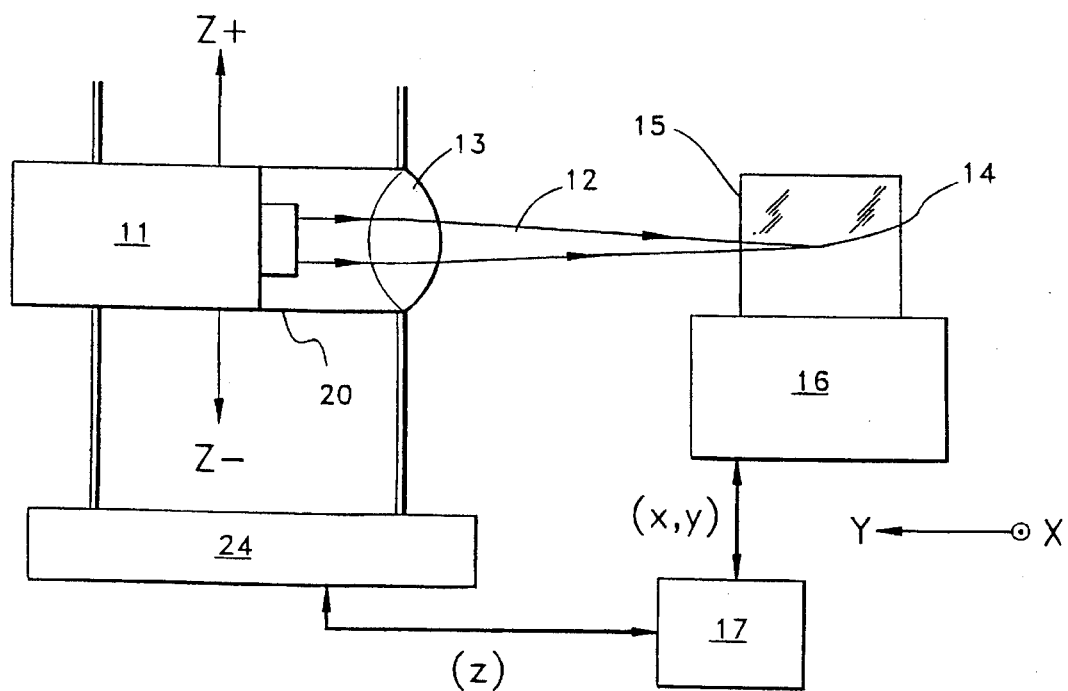
FIG. 5 is an alternate embodiment of the positioning system from FIG. 4.

In FIG. 5, movable platform 16 is capable of moving in two dimensions in the "XY" plane. Platform 16 is moved in a manner similar to an XY plotter. Impulse laser 11 and focusing lens 13 are fixed with respect to each other in housing 20. Housing 20 is mounted on laser movement controller 24 which moves housing 20 vertically in the "Z+" and "Z−" directions. Laser movement controller 24 and movable platform 16 cooperatively provide three-dimensional movement of focal point 14 relative to article 15. In this arrangement, controller 17 would transmit the new "X" and "Y" coordinates to movable platform 16 and the new "Z" coordinate to laser movement controller 24 to move focal point 14 to the new location.

As can be seen in FIG. 6, article 15 is attached to movable platform 16 which moves in the "X" direction, i.e., into and out of the page. Impulse laser 11 is fixed in position. Mirrors 25 and 26 direct laser beam 12 from impulse laser 11 through focusing lens 13 to focal point 14. Mirrors 25 and 26 and focusing lens 13 are located within a housing 20. Housing 20 is capable of moving along the "Y" axis from the position shown in solid line to the position shown in phantom line. Mirror 25 and lens 13 are maintained at a fixed distance from each other within housing 20. To alter the position of focal point 14 in the "Y" direction only, housing 20 is moved in the "Y" direction with mirrors 25, 26 and lens 13 remaining fixed with respect to each other. Mirror 25 and lens 13 can move together in the "Z" direction within housing 20. In order to move focal point 14 in the "Z" direction, mirror 26 would remain fixed and mirror 25 and lens 13 would move in the "Z" direction.

In order to move focal point 14' to focal point 14", mirror 26 moves in the "Y" direction (from the solid line position to the phantom line position), and mirror 25 and lens 13 would move in the "Z" direction (from the solid line position to the phantom line position). Article 15 would move in the "X" direction, if required. It would also be possible to have article 15 fixed and add a third mirror to housing 20 to provide movement of the beam in the "X" direction. In a case of three mirrors, each mirror would move along one axis parallel to the incident beam on that mirror.

While only several embodiments of the present invention have been shown and described, it is to be understood that many changes and modifications may be made thereunto without departing from the spirit and scope of the invention as defined in the appended claims.

What is claimed is:

1. An apparatus for etching an image within a solid article, comprising:

an impulse laser for generating a laser emission having a power rating of 50 Mjoules and a pulse length of 10 nsec and a pulse frequency of 1 Hertz;

a focusing lens located at an operative distance from said laser to focus the laser emission to a focal point within the article;

means for positioning the article with respect to the focal point including (a) a motor driven support bench for receiving and supporting the article;

(b) a threaded nut attached to said support bench; and (c) at least one step motor including a threaded rod cooperatively sized to engage said threaded nut, whereby said at least one step motor rotates said threaded rod to move said threaded nut and said support bench linearly along said threaded rod axis;

control means coupled to said impulse laser and said positioning means for firing said laser so that a local disruption having a lower translucence than the article occurs at the focal point within the article, without affecting an area surrounding the focal point, to form the image within the article.

* * * * *